US009628935B2

United States Patent
Anchan et al.

(10) Patent No.: US 9,628,935 B2
(45) Date of Patent: Apr. 18, 2017

(54) GROUP COMMUNICATIONS WITH MIXED CASTING SERVICES

(71) Applicant: QUALCOMM Incorporated, San Diego, CA (US)

(72) Inventors: Kirankumar Anchan, San Diego, CA (US); Yih-Hao Lin, San Diego, CA (US); Arvind V. Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 13/673,707

(22) Filed: Nov. 9, 2012

(65) Prior Publication Data

US 2013/0121133 A1 May 16, 2013

Related U.S. Application Data

(60) Provisional application No. 61/559,996, filed on Nov. 15, 2011.

(51) Int. Cl.
*H04W 4/00* (2009.01)
*H04W 4/06* (2009.01)
*H04W 76/00* (2009.01)

(52) U.S. Cl.
CPC .............. *H04W 4/00* (2013.01); *H04W 4/06* (2013.01); *H04W 76/005* (2013.01)

(58) Field of Classification Search
None
See application file for complete search history.

(56) References Cited

U.S. PATENT DOCUMENTS

| 7,397,824 | B2 | 7/2008 | Okubo |
| 7,885,199 | B2 | 2/2011 | Mooney et al. |
| 7,920,562 | B2 | 4/2011 | Patel |
| 2004/0131075 | A1* | 7/2004 | Sinnarajah et al. .......... 370/431 |
| 2006/0018253 | A1* | 1/2006 | Windisch et al. ............ 370/216 |
| 2007/0168523 | A1 | 7/2007 | Jiang et al. |
| 2007/0177592 | A1* | 8/2007 | Mooney .................. H04L 12/18 370/390 |
| 2009/0073894 | A1* | 3/2009 | Nimon et al. ................ 370/254 |
| 2009/0213774 | A1* | 8/2009 | Chapman et al. ............ 370/312 |

(Continued)

OTHER PUBLICATIONS

"3rd Generation Partnership Project; Technical Specification Group Services and System Aspects; Enhancements to IMS service functionalities facilitating multicast bearer services (Release 8)", 3GPP TR 23.847, 3GRP Mobile Competence Centre ; 650, Route Des Lucioles ; F-06921 Sophia-Antipolis Cedex ; France, vol. SA WG2, No. V8.0.0, Dec. 13, 2007, pp. 1-19, XP050553657.

(Continued)

*Primary Examiner* — Mounir Moutaouakil
(74) *Attorney, Agent, or Firm* — Changwoo Yang

(57) ABSTRACT

The disclosure is directed to group communications in a mixed casting services wireless communication system. An embodiment detects a loss of multicast coverage at a user equipment (UE), notifies a server of the loss of multicast coverage, wherein the server is configured to provide a desired multicast communication, and requests that communications related to the desired multicast communication be conducted on a unicast service using application layer signaling independent of link layer signaling.

28 Claims, 13 Drawing Sheets

(56) References Cited

U.S. PATENT DOCUMENTS

| | | |
|---|---|---|
| 2010/0165902 A1 | 7/2010 | Kvernvik et al. |
| 2010/0248742 A1* | 9/2010 | Song et al. |
| 2011/0103288 A1* | 5/2011 | Lee et al. ............... 370/312 |
| 2012/0243459 A1* | 9/2012 | Wu ................. H04L 1/1607 370/312 |
| 2013/0294320 A1* | 11/2013 | Jactat et al. ............ 370/312 |

OTHER PUBLICATIONS

Huawei: "[75#35]LTE: MBMS Service Continuity", 3GPP Draft; R2-115017 Summary of Email Discussion, 3GPP Mobile Competence Centre; 650, Route Des Lucioles ; F-06921 Sophia-Antipolis Cedex; France, vol. RAN WG2, No. Zhuhai; Oct. 10, 2011, Oct. 4, 2011, pp. 1-21, XP050540930, [retrieved on Oct. 4, 2011].
International Search Report and Written Opinion—PCT/US2012/065356—ISA/EPO—Feb. 13, 2013.
"OMA PoC Multicast; OMA-TS-PoC_Multicast_PoC-V2.1-20110802-A", Open Mobile Alliance (OMA), 4330 La Jolla Village Dr., Suite 110 San Diego, CA 92122 ; USA, [Online] No. 2.1, Aug. 2, 2011(Aug. 2, 2011), pp. 1-62, XP064058983.

* cited by examiner

GROUP COMMUNICATIONS WITH MIXED CASTING SERVICES

CLAIM OF PRIORITY

The present Application for patent claims priority to Provisional Patent Application No. 61/559,996 entitled "GROUP COMMUNICATIONS WITH MIXED CASTING SERVICES" filed Nov. 15, 2011, and assigned to the assignee hereof and hereby expressly incorporated by reference herein in its entirety.

FIELD OF DISCLOSURE

The present disclosure relates generally to communication, and more specifically to techniques for supporting group communications on mixed casting services (e.g., unicast and multicast services) in a wireless communication system.

BACKGROUND

A cellular communication system can support bi-directional communication for multiple users by sharing the available system resources. Cellular systems are different from broadcast systems that can mainly or only support unidirectional transmission from broadcast stations to users. Cellular systems are widely deployed to provide various communication services and may be multiple-access systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc.

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services. However, for group communication services that require low latency and a short time to establish the group communication, the setup time of conventional multicast channels can be a detriment to system performance.

SUMMARY

The disclosure is directed to group communications in a mixed casting services wireless communication system. An embodiment detects a loss of multicast coverage at a user equipment (UE), notifies a server of the loss of multicast coverage, wherein the server is configured to provide a desired multicast communication, and requests that communications related to the desired multicast communication be conducted on a unicast service using application layer signaling independent of link layer signaling.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
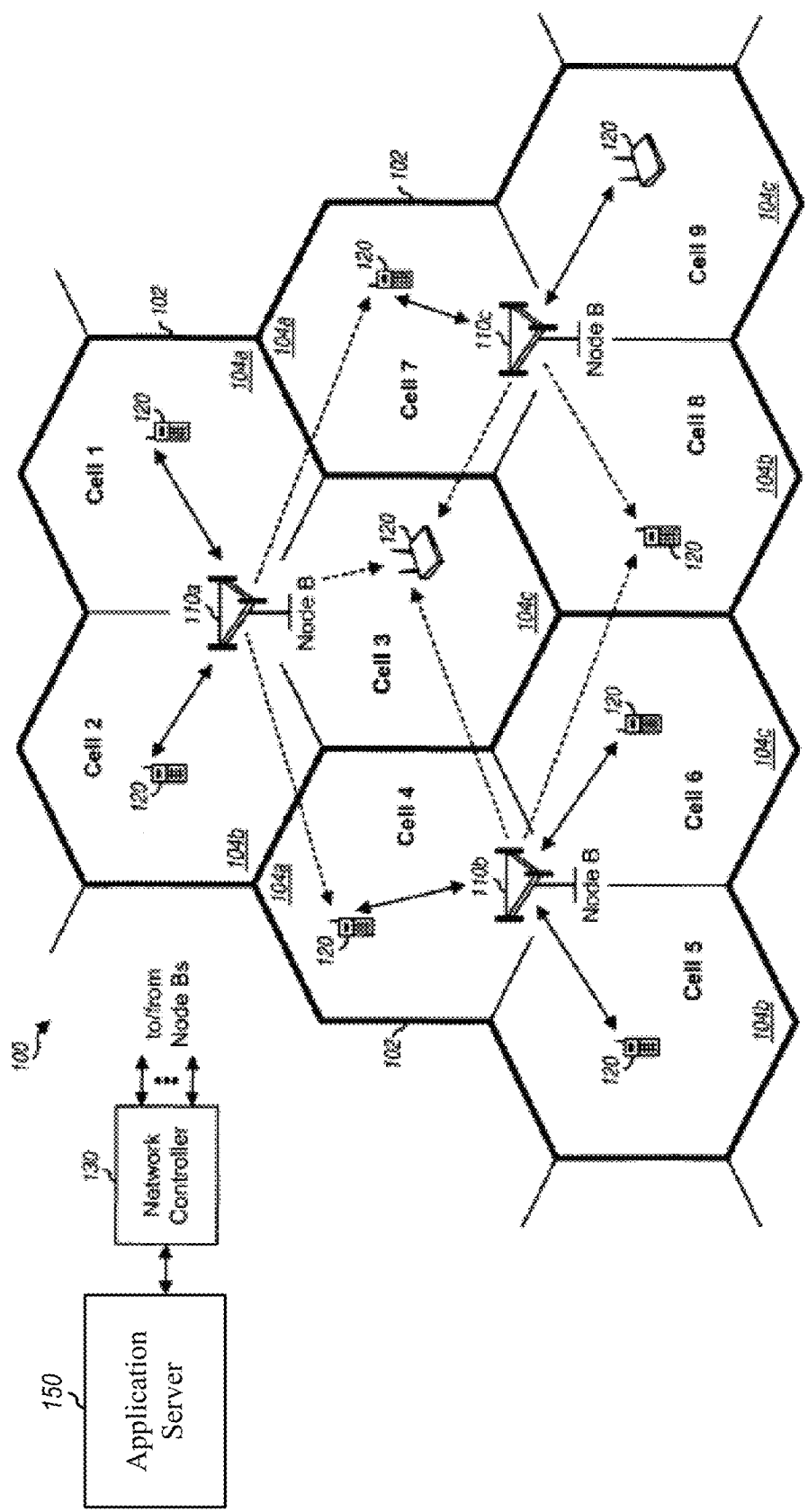
FIG. 1 illustrates a wireless communication system.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. Further, as used herein the term group communication, push-to-talk, or similar variations are meant to refer to a server arbitrated service between two or more devices.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The term group communication is used to refer to a general category of server arbitrated group communication technologies such as Push-to-Talk (PTT) communications.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The techniques described herein may be used for various cellular communication systems such as CDMA, TDMA, FDMA, OFDMA and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a cellular communication system 100, which may be an LTE system. Cellular communication system 100 may include a number of Node Bs and other network entities. For simplicity, only three Node Bs 110a, 110b and 110c are shown in FIG. 1. A Node B may be a fixed station used for communicating with the user equipments (UEs) and may also be referred to as an evolved Node B (eNB), a base station, an access point, etc. Each Node B 110a-c (collectively Node B 110) provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of a cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

Network controller 130 may couple to multiple Node Bs to provide coordination and control for the Node Bs under its control, and to route data for terminals served by these Node Bs. Cellular communication system 100 may also include other network entities not shown in FIG. 1. Further, as illustrated network controller 130 may be operably coupled to an application server 150 to provide group communication services to the various UEs 120 through cellular communication system 100. It will be appreciated that there can be many other network and system entities that can be used to facilitate communications between the UEs and servers and information outside of the access network. Accordingly, the various embodiments disclosed herein are not limited to the specific arrangement or elements detailed in the various figures.

Figure 2:
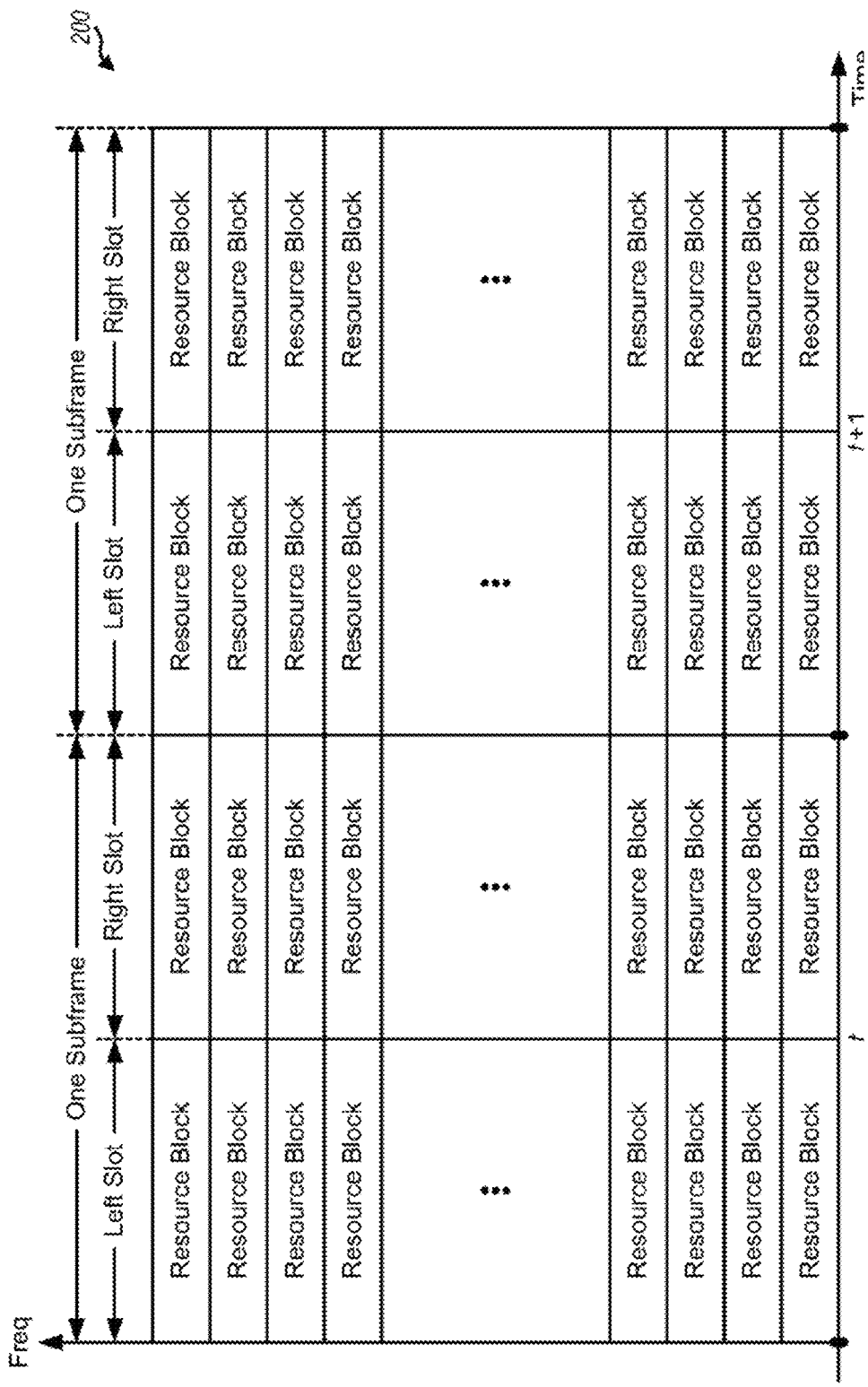
FIG. 2 illustrates an example transmission structure.

FIG. 2 shows an example transmission structure 200 that may be used for the downlink in cellular communication system 100. The transmission timeline may be partitioned into units of radio frames. Each radio frame may have a predetermined duration (e.g., 10 milliseconds (ms)) and may be partitioned into 10 sub frames. Each sub frame may include two slots, and each slot may include a fixed or configurable number of symbol periods, e.g., six or seven symbol periods.

The system bandwidth may be partitioned into multiple (K) subcarriers with orthogonal frequency division multiplexing (OFDM). The available time frequency resources may be divided into resource blocks. Each resource block may include Q subcarriers in one slot, where Q may be equal to 12 or some other value. The available resource blocks may be used to send data, overhead information, pilot, etc.

The system may support evolved multimedia broadcast/multicast services (E-MBMS) for multiple UEs as well as unicast services for individual UEs. A service for E-MBMS may be referred to as an E-MBMS service or flow and may be a broadcast service/flow or a multicast service/flow.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels (denoted as "L"), transport channels (denoted as "T"), and physical channels (denoted as "P") used in LTE and provides a short description for each channel.

TABLE 1

| Name | Channel | Type | Description |
| --- | --- | --- | --- |
| Broadcast Control Channel | BCCH | L | Carry system information |
| Broadcast Channel | BCH | T | Carry master system Information |
| E-MBMS Traffic Channel | MTCH | L | Carry configuration information for E-MBMS services. |

TABLE 1-continued

| Name | Channel | Type | Description |
|---|---|---|---|
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 1, different types of overhead information may be sent on different channels. Table 2 lists some types of overhead information and provides a short description for each type. Table 2 also gives the channel(s) on which each type of overhead information may be sent, in accordance with one design.

TABLE 2

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

The system may support multiple operational modes for E-MBMS, which may include a multi-cell mode and a single-cell mode. The multi-cell mode may have the following characteristics:
  Content for broadcast or multicast services can be transmitted synchronously across multiple cells.
  Radio resources for broadcast and multicast services are allocated by an MBMS Coordinating Entity (MCE), which may be logically located above the Node Bs.
  Content for broadcast and multicast services is mapped on the MCH at a Node B.
  Time division multiplexing (e.g., at sub frame level) of data for broadcast, multicast, and unicast services.

The single-cell mode may have the following characteristics:
  Each cell transmits content for broadcast and multicast services without synchronization with other cells.
  Radio resources for broadcast and multicast services are allocated by the Node B.
  Content for broadcast and multicast services is mapped on the DL-SCH.
  Data for broadcast, multicast, and unicast services may be multiplexed in any manner allowed by the structure of the DL-SCH.

In general, E-MBMS services may be supported with the multi-cell mode, the single-cell mode, and/or other modes. The multi-cell mode may be used for E-MBMS multicast/broadcast single frequency network (MBSFN) transmission, which may allow a UE to combine signals received from multiple cells in order to improve reception performance.

Figure 3:
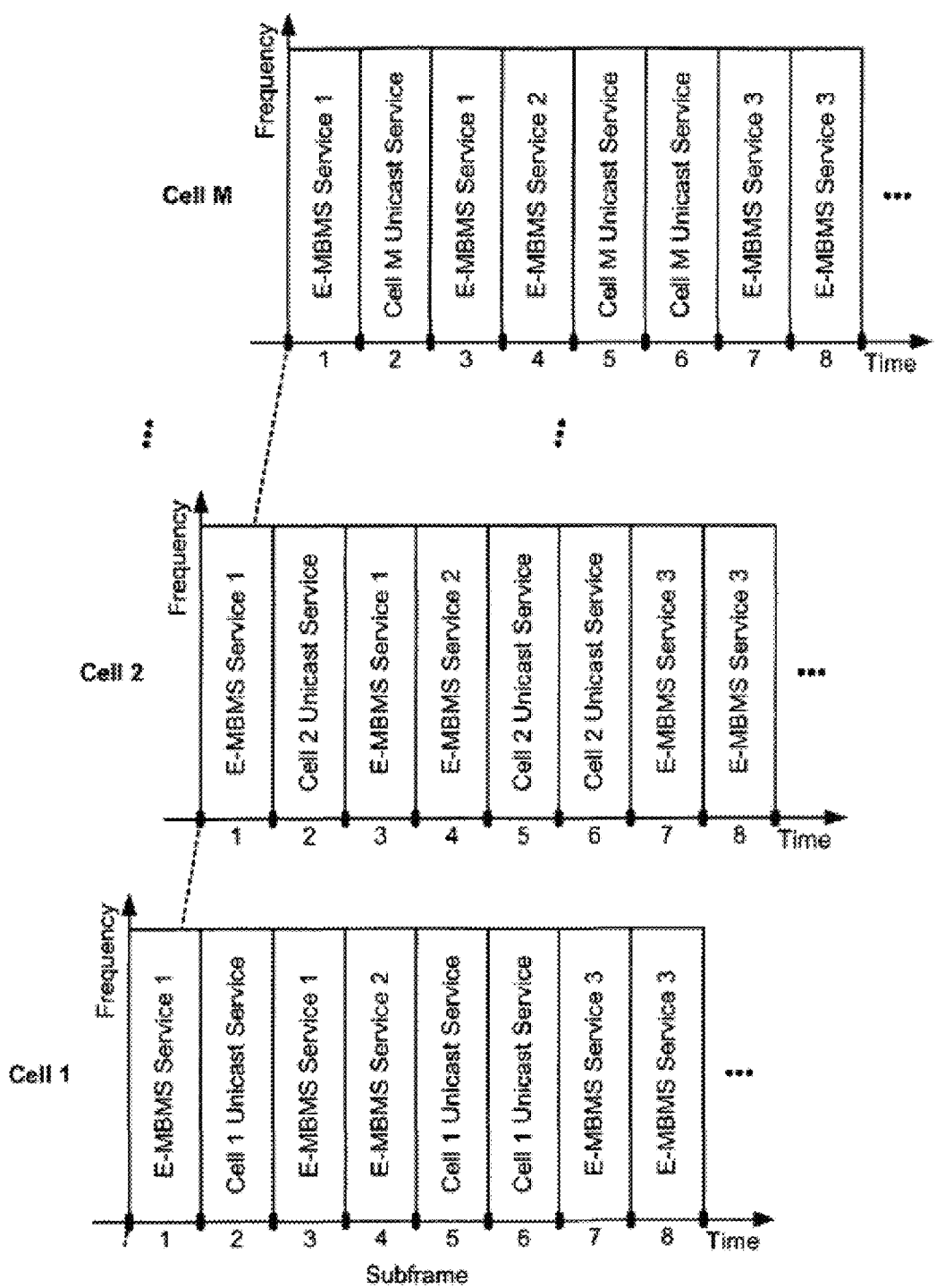
FIG. 3 illustrates example transmissions of different services in a multi-cell mode.

FIG. 3 shows example transmissions of E-MBMS and unicast services by M cells 1 through M in the multi-cell mode, where M may be any integer value. For each cell, the horizontal axis may represent time, and the vertical axis may represent frequency. In one design of E-MBMS, which is assumed for much of the description below, the transmission time line for each cell may be partitioned into time units of sub frames. In other designs of E-MBMS, the transmission time line for each cell may be partitioned into time units of other durations. In general, a time unit may correspond to a sub frame, a slot, a symbol period, multiple symbol periods, multiple slots, multiple sub frames, etc.

In the example shown in FIG. 3, the M cells transmit three E-MBMS services 1, 2 and 3. All M cells transmit E-MBMS service 1 in sub frames 1 and 3, E-MBMS service 2 in sub frame 4, and E-MBMS service 3 in sub frames 7 and 8. The M cells transmit the same content for each of the three E-MBMS services. Each cell may transmit its own unicast service in sub frames 2, 5 and 6. The M cells may transmit different contents for their unicast services.

Figure 4:
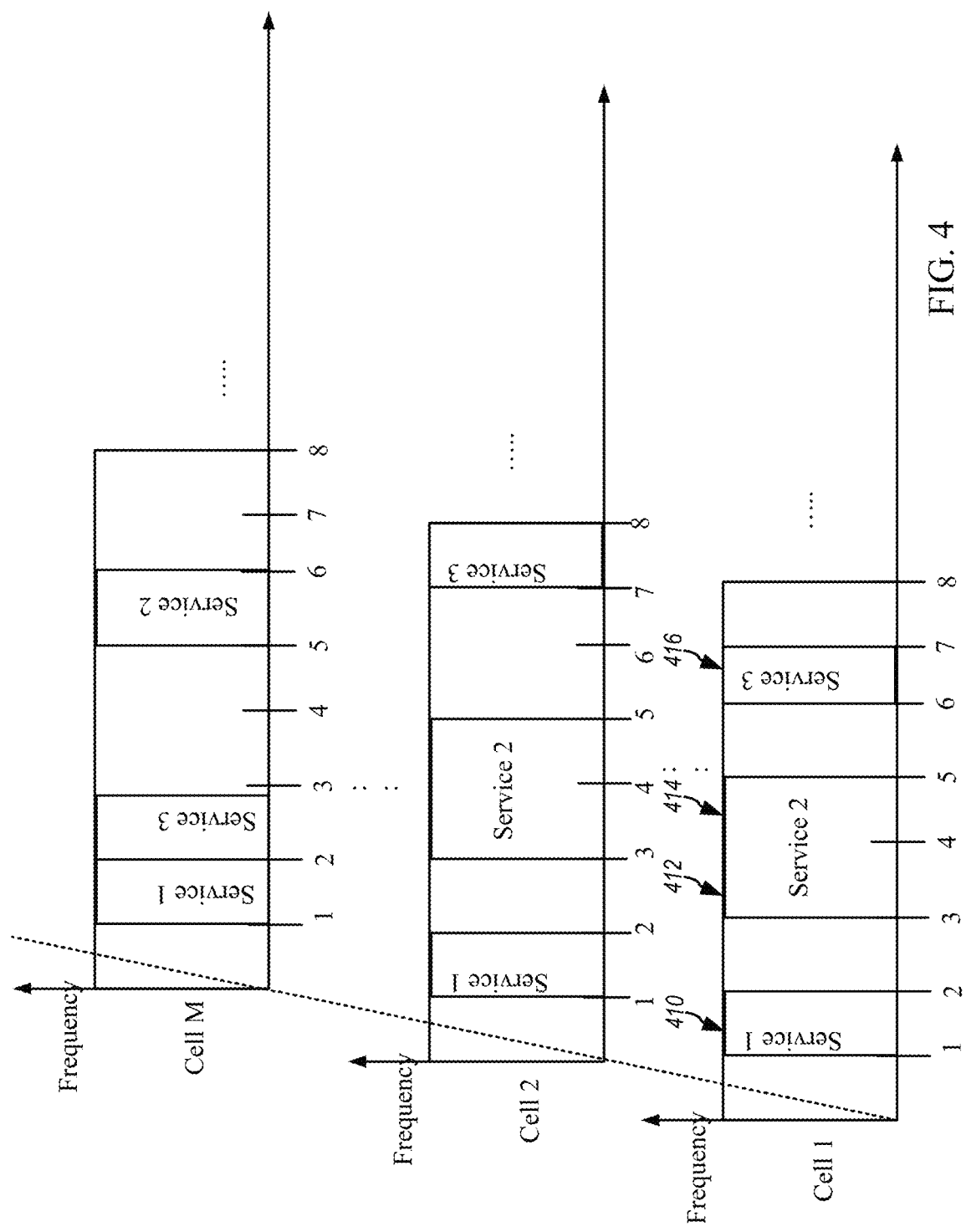
FIG. 4 illustrates example transmissions of different services in a single-cell mode.

FIG. 4 shows example transmissions of E-MBMS and unicast services by M cells in the single-cell mode. For each cell, the horizontal axis may represent time, and the vertical axis may represent frequency. In the example shown in FIG. 4, the M cells transmit three E-MBMS services 1, 2 and 3. Cell 1 transmits E-MBMS service 1 in one time frequency block 410, E-MBMS service 2 in a time frequency blocks 412 and 414, and E-MBMS service 3 in one time frequency blocks 416. Similarly other cells transmit services 1, 2 and 3 as shown in the FIG. 4.

In general, an E-MBMS service may be sent in any number of time frequency blocks. The number of sub frames may be dependent on the amount of data to send and possibly other factors. The M cells may transmit the three E-MBMS services 1, 2 and 3 in time frequency blocks that may not be aligned in time and frequency, as shown in FIG. 4. Furthermore, the M cells may transmit the same or different contents for the three E-MBMS services. Each cell may transmit its own unicast service in remaining time frequency resources not used for the three E-MBMS services. The M cells may transmit different contents for their unicast services.

FIGS. 3 and 4 show example designs of transmitting E-MBMS services in the multi-cell mode and the single-cell mode. E-MBMS services may also be transmitted in other manners in the multi-cell and single-cell modes, e.g., using time division multiplexing (TDM).

Figure 5A:
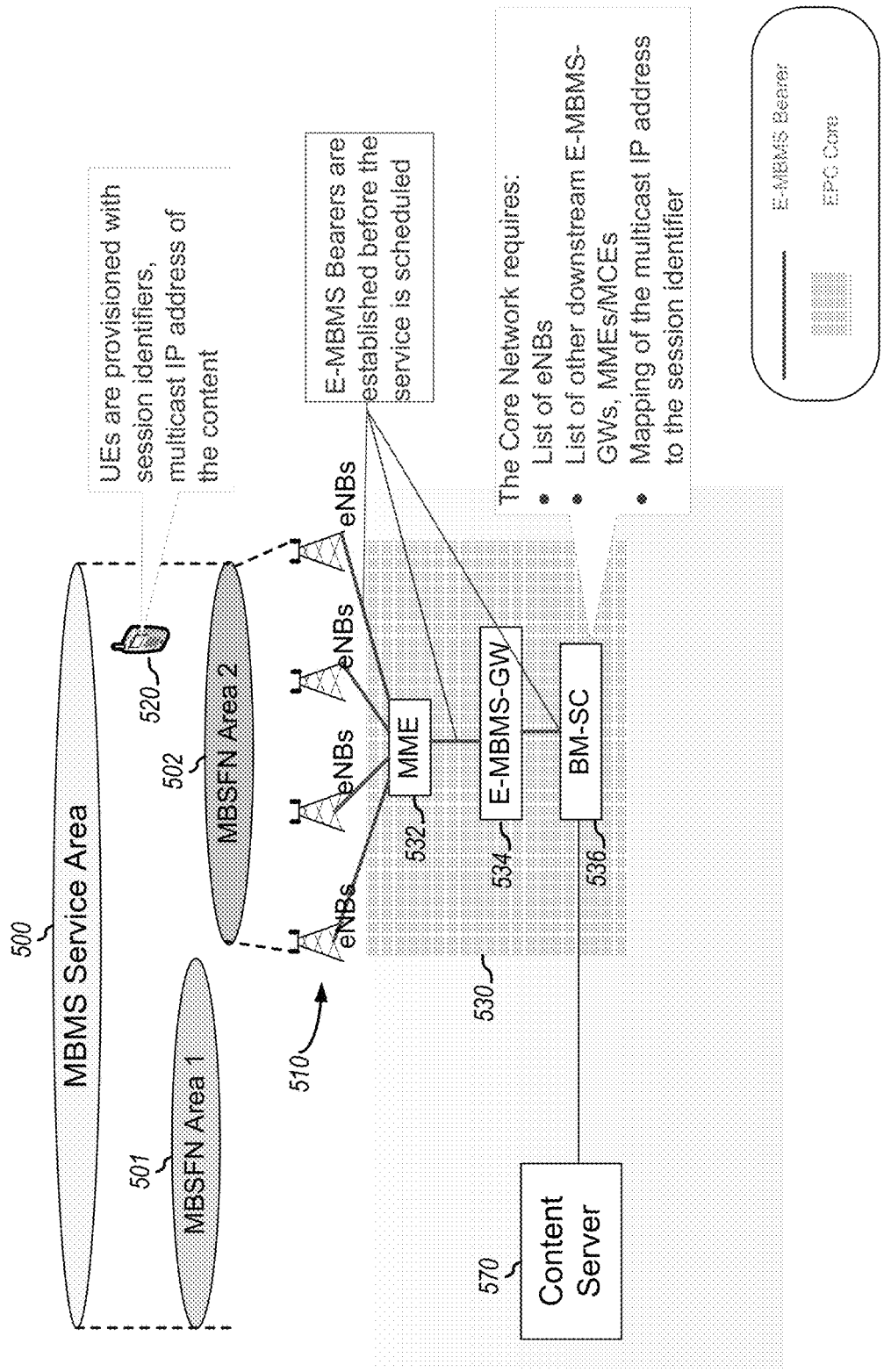
FIGS. 5A and 5B illustrate additional wireless communication systems that can support broadcast/multicast services.

FIG. 5A is another illustration of a wireless network that can implement evolved multimedia broadcast/multicast services (E-MBMS) or MBMS services, which are used interchangeably herein. An MBMS service area 500 can include multiple MBSFN areas (e.g. MBSFN area 1, 501 and MBSFN area 2, 502). Each MBSFN area can be supported by one or more eNode Bs 510, which are coupled to a core network 530. Core network 530 can include various elements (e.g., MME 532, E-MBMS gateway 534, and broadcast multicast service center (BM-SC) 536 to facilitate controlling and distributing the content from content provider 570 (which may include an application server, etc.) to the MBMS service area 500.

Figure 5B:
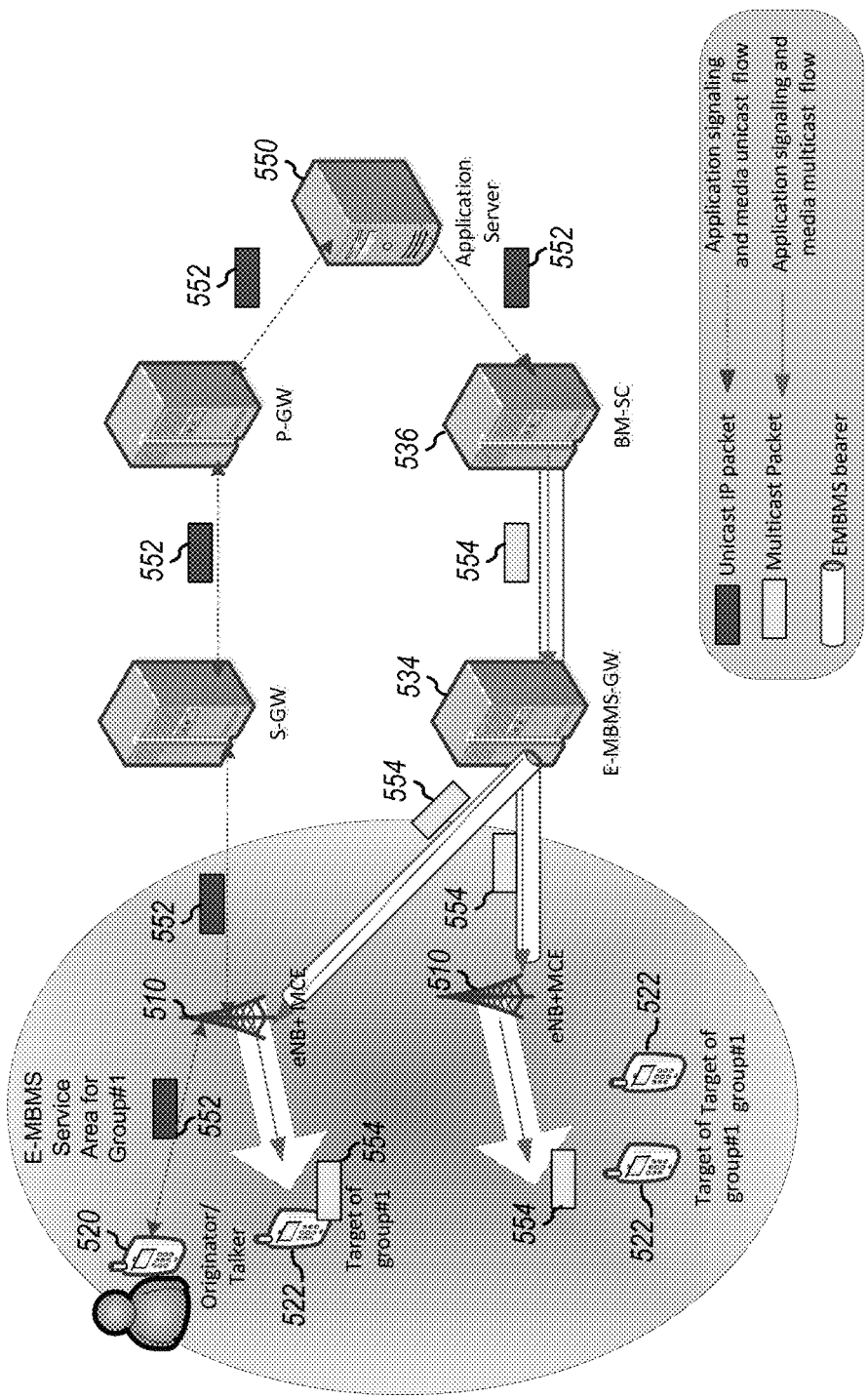

FIG. 5B is another illustration of a wireless network that can implement multimedia broadcast/multicast services (MBMS) as disclosed herein. In the illustrated network an application server 550 (e.g., PTT server) can serve as the content server. The application server 550 can communicate media in unicast packets 552 to the network core where the content can be maintained in a unicast configuration and transmitted as unicast packets to a given UE (e.g., originator/talker 520) or can be converted through the BM-SC to multicast packets 554, which can then be transported target UE's 522. For example, a PTT call can be initiated by UE 520 by communicating with application server 550 via unicast packets 552 over a unicast channel. It will be noted that for the call originator/call talker 520 both the application signaling and media are communicated via the unicast channel on the uplink or the reverse link. The application server 550 can then generate a call announce/call setup request and communicate these to the target UEs 522. The communication can be communicated to the target UEs 522 via multicast packets 554 over a multicast flow, as illustrated in this particular example. Further, it will be appreciated in this example, that both the application signaling and media can be communicated over the multicast flow in the downlink or the forward link. Unlike conventional systems, having both the application signaling and the media in the multicast flow, avoids the need of having a separate unicast channel for the application signaling. However, to allow for application signaling over the multicast flow of the illustrated system, an evolved packet system (EPS) bearer will be established (and persistently on) between the BM-SC 536, EMBS GW 534, eNBs 510 and target UEs 522.

Embodiments can use two broadcast streams, each a separate E-MBMS flow over an LTE broadcast flow, with its own application level broadcast stream and its own (multicast IP address) for each defined broadcast region 502, 501 (e.g., a subset of sectors within the network). Although illustrated as separate regions, it will be appreciated that the broadcast areas 502, 501 may overlap.

Figure 5C:
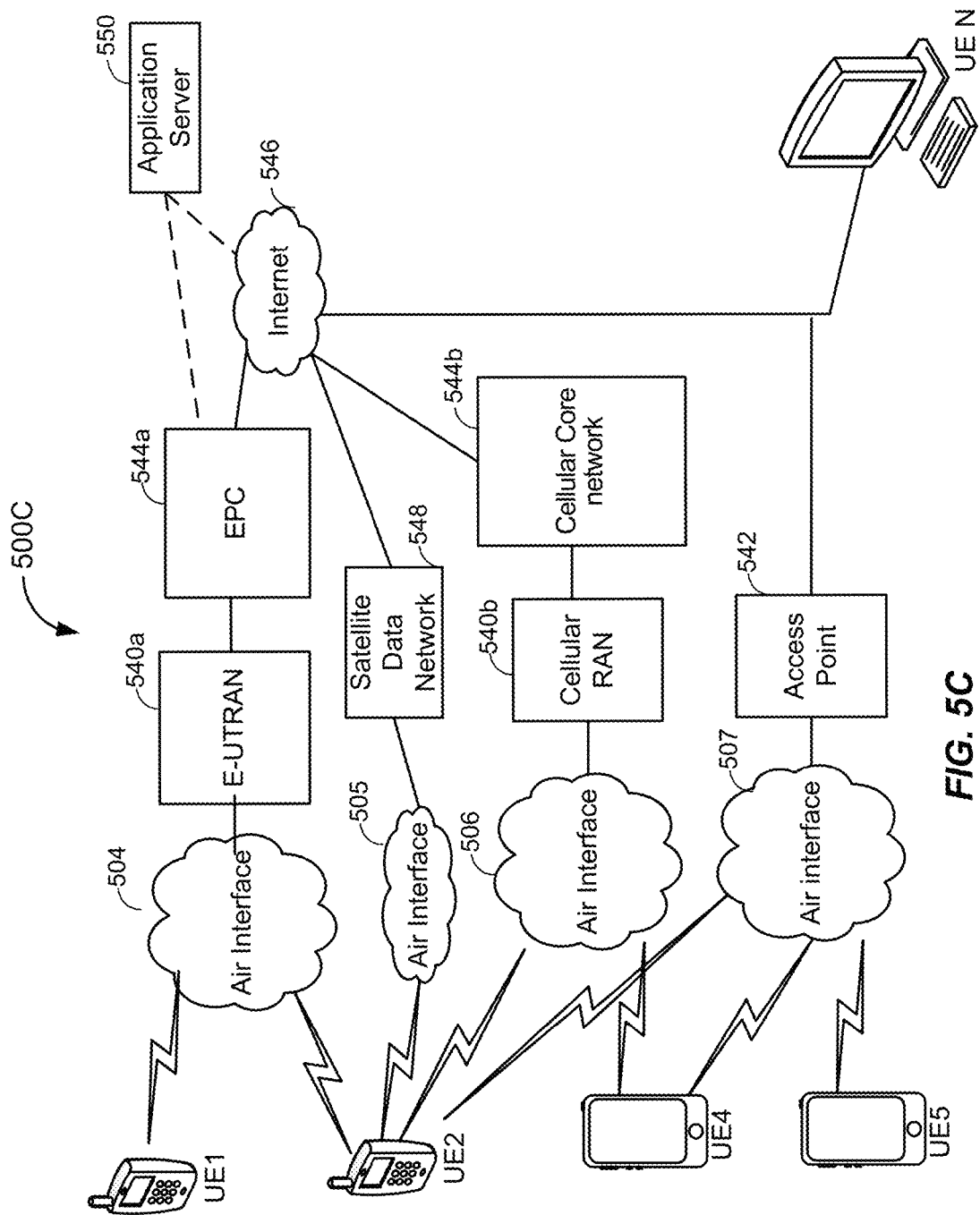
FIG. 5C illustrates a high-level system architecture of a wireless communications system in accordance with an embodiment.

FIG. 5C illustrates a high-level system architecture of a wireless communications system 500C in accordance with an embodiment. The wireless communications system 500C contains UEs 1 ... N. The UEs 1 ... N can include cellular telephones, personal digital assistant (PDAs), pagers, a laptop computer, a desktop computer, and so on.

Referring to FIG. 5C, UEs 1 ... N are configured to communicate with an access network (e.g., an evolved UMTS terrestrial radio access network (E-UTRAN) 540a, a cellular RAN 540b, a satellite data network 548, an access point 542, etc.) over a physical communications interface or layer, shown in FIG. 5C as air interfaces 504, 505, 506, 507 and/or a direct wired connection. The air interfaces 504 and 506 can comply with a given cellular communications protocol (e.g., CDMA, EVDO, eHRPD, GSM, EDGE, W-CDMA, LTE, etc.), while the air interface 507 can comply with a wireless IP protocol (e.g., IEEE 802.11) and the air interface 505 can comply with a satellite data network protocol. The E-UTRAN 540a and the cellular RAN 540b can include a plurality of access points that serve UEs over air interfaces, such as the air interfaces 504 and 506. The access points in the E-UTRAN 540a and the cellular RAN 540b can be referred to as access nodes or ANs, access points or APs, base stations or BSs, Node Bs, eNode Bs, and so on. These access points can be terrestrial access points (or ground stations), or satellite access points. The E-UTRAN 540a and the cellular RAN 540b are configured to connect to an evolved packet system (EPC) 544a and a cellular core network 544b, respectively, that can perform a variety of functions, including bridging circuit switched (CS) calls between UEs served by the E-UTRAN 540a and the cellular RAN 540b and other UEs served by the E-UTRAN 540a and the cellular RAN 540b or a different RAN altogether, and can also mediate an exchange of packet-switched (PS) data with external networks such as Internet 546.

The Internet 546 includes a number of routing agents and processing agents (not shown in FIG. 5C for the sake of convenience). In FIG. 5C, UE N is shown as connecting to the Internet 546 directly (i.e., separate from the EPC 544a and core network 544b, such as over an Ethernet connection of WiFi or 802.11-based network). The Internet 546 can thereby function to bridge packet-switched data communications between UE N and UEs 1 ... N via the EPC 544a and core network 544b.

Also shown in FIG. 5C is the access point 542 that is separate from the E-UTRAN 540a and cellular RAN 540b. The access point 542 may be connected to the Internet 546 independent of the EPC 544a and core network 544b (e.g., via an optical communication system such as FiOS, a cable modem, etc.). The air interface 507 may serve UE 4 or UE 5 over a local wireless connection, such as IEEE 802.11 in an example. UE N is shown as a desktop computer with a wired connection to the Internet 546, such as a direct connection to a modem or router, which can correspond to the access point 542 itself in an example (e.g., for a WiFi router with both wired and wireless connectivity).

Referring to FIG. 5C, an application server 550 is shown as connected to the Internet 546, the EPC 544a, and/or the core network 544b. The application server 550 can be implemented as a plurality of structurally separate servers, or alternately may correspond to a single server. The application server 550 is configured to support one or more communication services (e.g., Voice-over-Internet Protocol (VoIP) sessions, Push-to-Talk (PTT) sessions, group communication sessions, social networking services, etc.) for UEs that can connect to the application server 550 via the EPC 544a, the core network 544b, and/or the Internet 546.

As noted in the foregoing, E-MBMS services can be used to distribute multicast data to groups and could be useful in group communication systems (e.g., Push-to-Talk (PTT) calls). Additionally, conventional systems can have unicast group communications, which can be used for the originator/talker 520 and or other UEs in the group (e.g., UEs that are not in an E-MBMS service area or lose coverage). Mixed casting can be used in some situations to switch between multicast and unicast during a group call. Mixed casting can use application layer signaling. For example, application layer signaling can be provided to switch to a unicast service without user intervention when multicast coverage drops while in call. This would result in increased unicast link usage and complexity on the client and the application server, but would increase the call availability. Additionally, to enable call reception at the beginning of the call on unicast links for a large group multicast call, application layer signaling can also be used. The application server can be used to maintain the state of the UE to determine whether the UE is to be serviced on unicast before the call set up to meet the performance criteria and to avoid any media clipping. This would also result in usage of additional unicast links for such targets.

Embodiments provide for mobility based mixed casting services. As discussed above, application layer signaling can be provided to switch to unicast service without user intervention when multicast coverage drops while in-call or even prior to a call setup. In the following, two options are proposed to address the mixed casting services while in a call. Option 1 can include detection of the absence of MBSFN area from MCCH or SIB messages. Option 2 can include detection of absence of application server based periodic keep-alive multicast signaling.

Before the call has been initiated, when the users are outside the MBSFN area (e.g., 501 or 502 of FIG. 5A) to enable call reception at the beginning of the call on unicast, application layer signaling can be used, as noted above.

Figure 6:
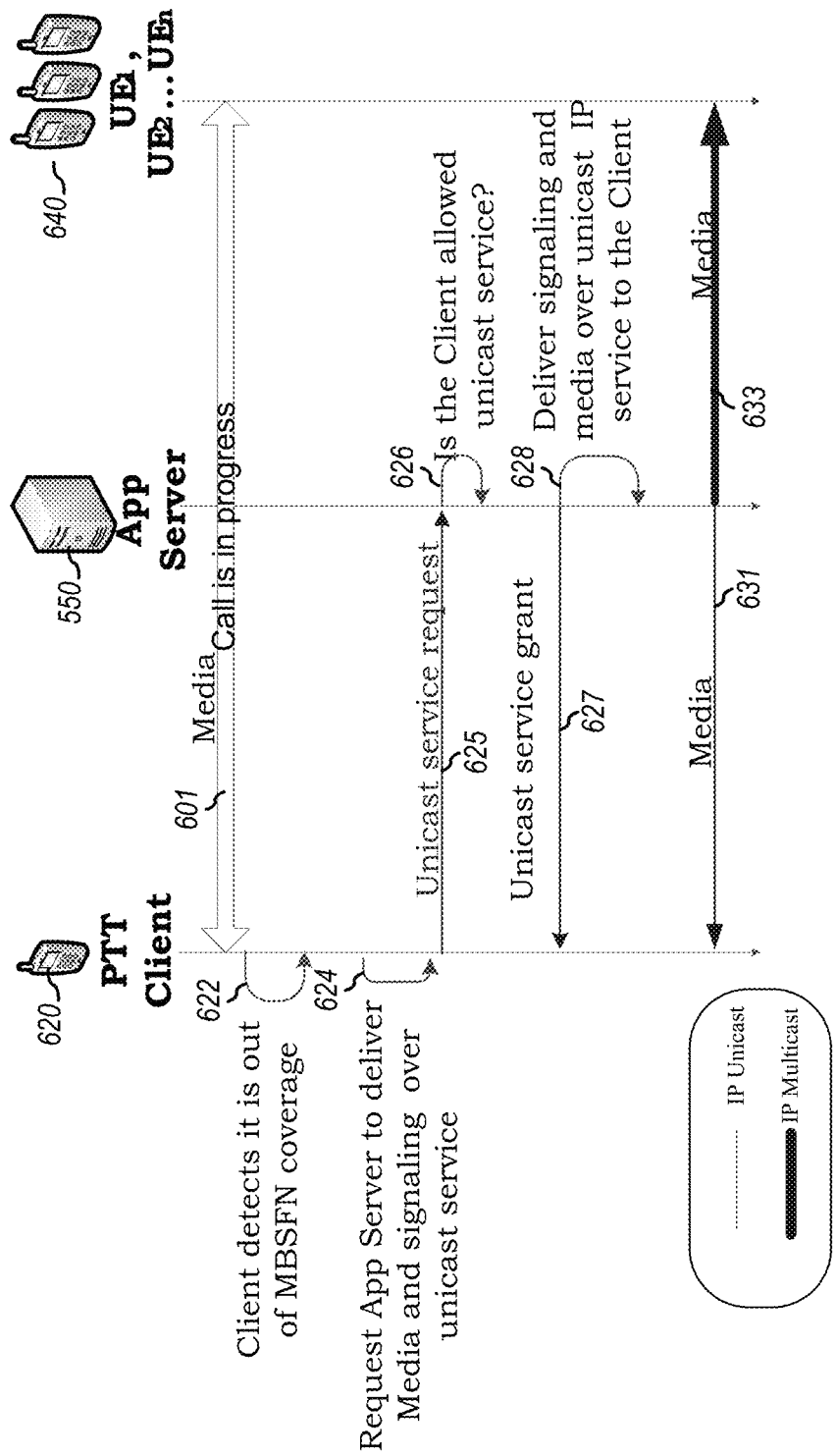
FIG. 6 illustrates an example of mixed casting in accordance with at least one embodiment.

FIG. 6 illustrates an example of a process for mixed casting according to Option 1 discussed above. In embodiments related to this aspect, the client UE 620 (e.g., a PTT client) can be in communication 601 (e.g., in a group call) with an application server 550 and also additional group members 640 (e.g., UE$_1$-UE$_n$). At some point, 622, the client UE 620 can detect that it has lost coverage (e.g., client UE 620 can detect loss of MBSFN area via MCCH or SIB messages). Upon detecting a loss of coverage, the client UE 620 can notify the application server 550 that it is out of out of coverage 624. For example, using unicast application based signaling 625, the client UE 620 can request that the application server 550 deliver media and signaling over the unicast service. At 626, after receipt of the request, the application server 550 can determine if the client UE 620 is allowed to use unicast service for the group communication (e.g., call in progress). If the client UE 620 is allowed to receive the call via unicast services, then the unicast service grant 627 is acknowledged to the client UE 620 and application server 550 is configured to deliver signaling and media over the unicast service 628. The call in progress can then continue with the media and signaling being provided via a unicast service 631 to client UE 620 and via multicast services 633 to group members 640.

In one embodiment, the client UE 620 can monitor neighboring cells to determine if the multicast service is supported. As will be appreciated, neighboring cells in an MBSFN system often broadcast the same information at the same frequency and slot to allow for soft combining. Accordingly, when client UE 620 is near the borders of an MBSFN area, it can detect this condition because of the lack of neighboring cells broadcasting the multicast service or lack of its multicast service identifiers, e.g. MBSFN area ID, TMGI, session ID, etc. When detected, the client UE 620 can inform the application server 550 to reserve unicast resources as it may potentially lose the multicast service. The application server 550 can reserve or at least cache this potential service change for client UE 620.

Figure 7:
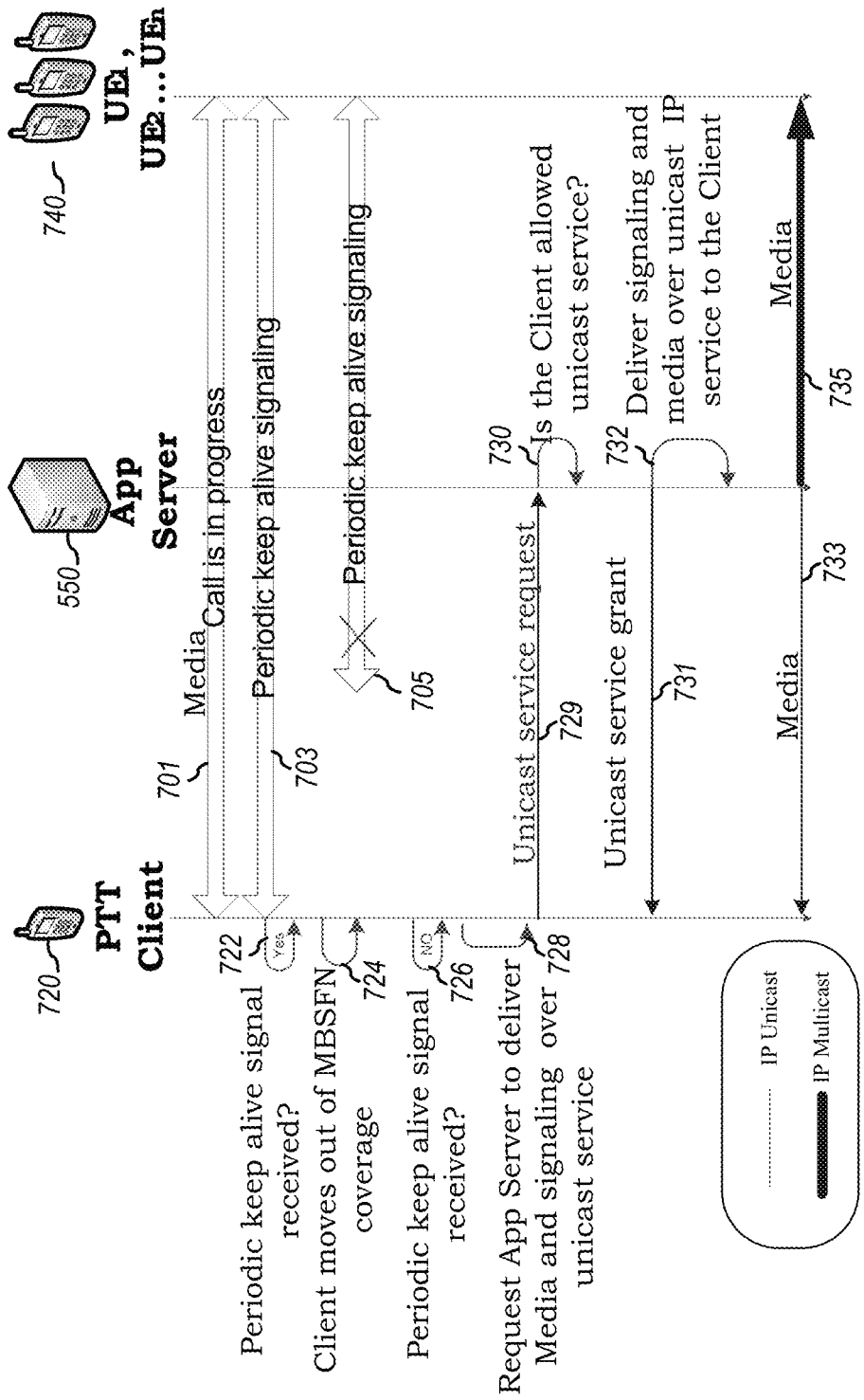
FIG. 7 illustrates an example of mixed casting in accordance with at least one embodiment.

FIG. 7 illustrates an example of a process for mixed casting according to Option 2 discussed above. In embodiments related to this aspect, the client UE 720 (e.g., a PTT client) can be in communication 701 with an application server 550 and also additional group members 740 (e.g., UE$_1$-UE$_n$). In addition to the communication 701, the application server 550 can transmit periodic keep alive signaling 703 on the multicast service that is received 722 by client UE 720. At some point after, client UE 720 may move outside of the multicast service area 724. After which, a subsequent periodic keep alive signaling 705 is not received 726 by the client UE 720. After detecting the loss of the periodic keep alive signaling not received 726, the client UE can determine to request the application server 550 to deliver media and signaling over a unicast service 728. The unicast service request 729 can be transmitted to the application server 550. At 730, after receipt of the request, the application server 550 can determine if the client UE 720 is allowed to use unicast service for the group communication (e.g., call in progress). If the client UE 720 is allowed to receive the call via unicast services, then the unicast service grant 731 is acknowledged to the client UE 720 and application server 550 is configured to deliver signaling and media over the unicast service 732. The call in progress can then continue with the media and signaling being provided via a unicast service 733 to client UE 720 and via multicast services 735 to group members 740.

Additionally, when the client UE 720 is requesting to be transitioned to unicast service, the client UE 720 can send an index of the last packet that was correctly received by the client UE 720 to enable the application server 550 to forward any media that was missed by the client UE 720 during the multicast to unicast transition. This index may represent the sequence number of the RTP packet or the sequence number of another transport layer or application layer packet. To support lossless multicast to unicast transition, the application server 550 may optionally buffer any data used for the duration of the call for a configurable period. This buffering period on the application server 550 depends on the type of application being delivered over the multicast service. For example, for a file download like service, this buffer can be the entire file, whereas for real time service, the buffer could be a few seconds of data as acceptable by the replay logic on the client. Accordingly, it will be appreciated that in some embodiments the media over unicast service 733 may be different (at least in terms of a time delay) than the media over the multicast service 735.

Figure 8:
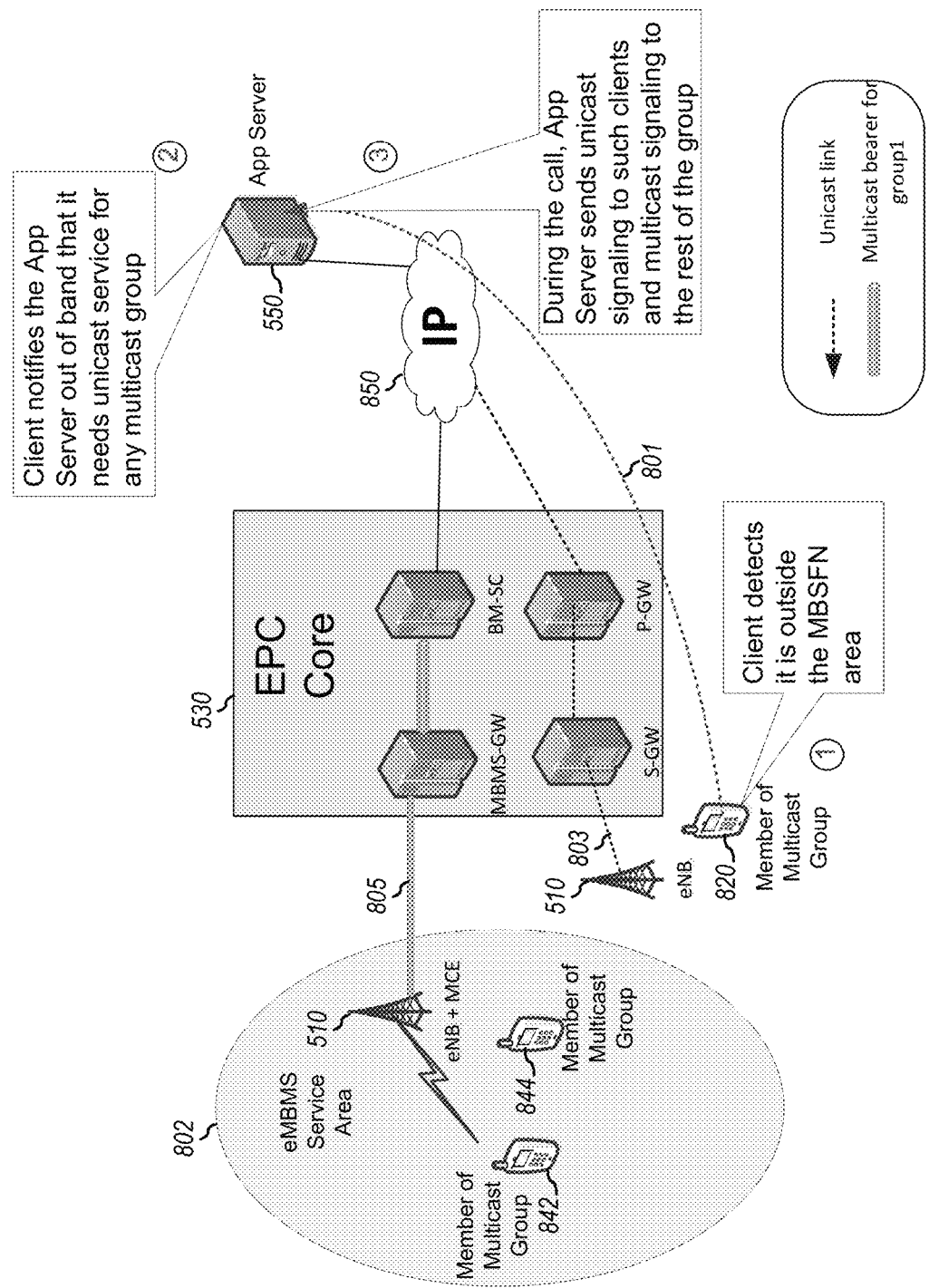
FIG. 8 illustrates an example of mixed casting in accordance with at least one embodiment.

FIG. 8 illustrates an example of a process for mixed casting at call setup. In the illustrated embodiment, the application server 550 can communicate with a plurality of multicast group members (e.g., UE 820, UE 842, and UE 844) via core network 530. Some of the multicast group members (e.g., UE 842 and UE 844) are in an MBSFN service area 802 which can be supported by one or more eNode Bs 510, which are coupled to a core network 530. Core network 530 can include various elements as discussed in the foregoing to facilitate communications via multicast services 805 and/or unicast services 803. The application server 550 may be connected to the core network 530 via an IP network 850 (e.g., the Internet and/or on or more local area networks).

Prior to a call being established, the client UE 820, which is a multicast group member, detects it is outside the multicast service area 802 (e.g., MBSFN area). After detecting this condition, the client UE 820 can notify the application server 550 over a unicast link 801 that it has no multicast service available and request unicast service for any communications related to the multicast group. The unicast link 801 can be an interface on LTE, UMTS, CDMA 1×, CDMA Ev-Do, WiFi, or satellite based links. The various types of unicast links 801 are illustrated in FIG. 5C. Since there is no active call, the client UE 820 can communicate to the application server 550 using out of band signaling. In the absence of support from the air interface technology for mixed casting support, the client UE 820 can use application layer signaling to notify the application server 550 that it is out of the MBSFN area and needs unicast service. Upon receipt of the request from client UE 820, the application server 550 can determine that there is at least one unicast target (client UE 820) in addition to multicast group members 842, 844 and store this information relative to client UE 820 for use when setting up and conducting a call. Accordingly, for call setup and communicating subsequent media and signaling the application server 550 will communicate with client UE 820 via a unicast service 803. The call set-up can be transmitted via a unicast call announcement in addition to the multicast call announcements.

Figure 9:
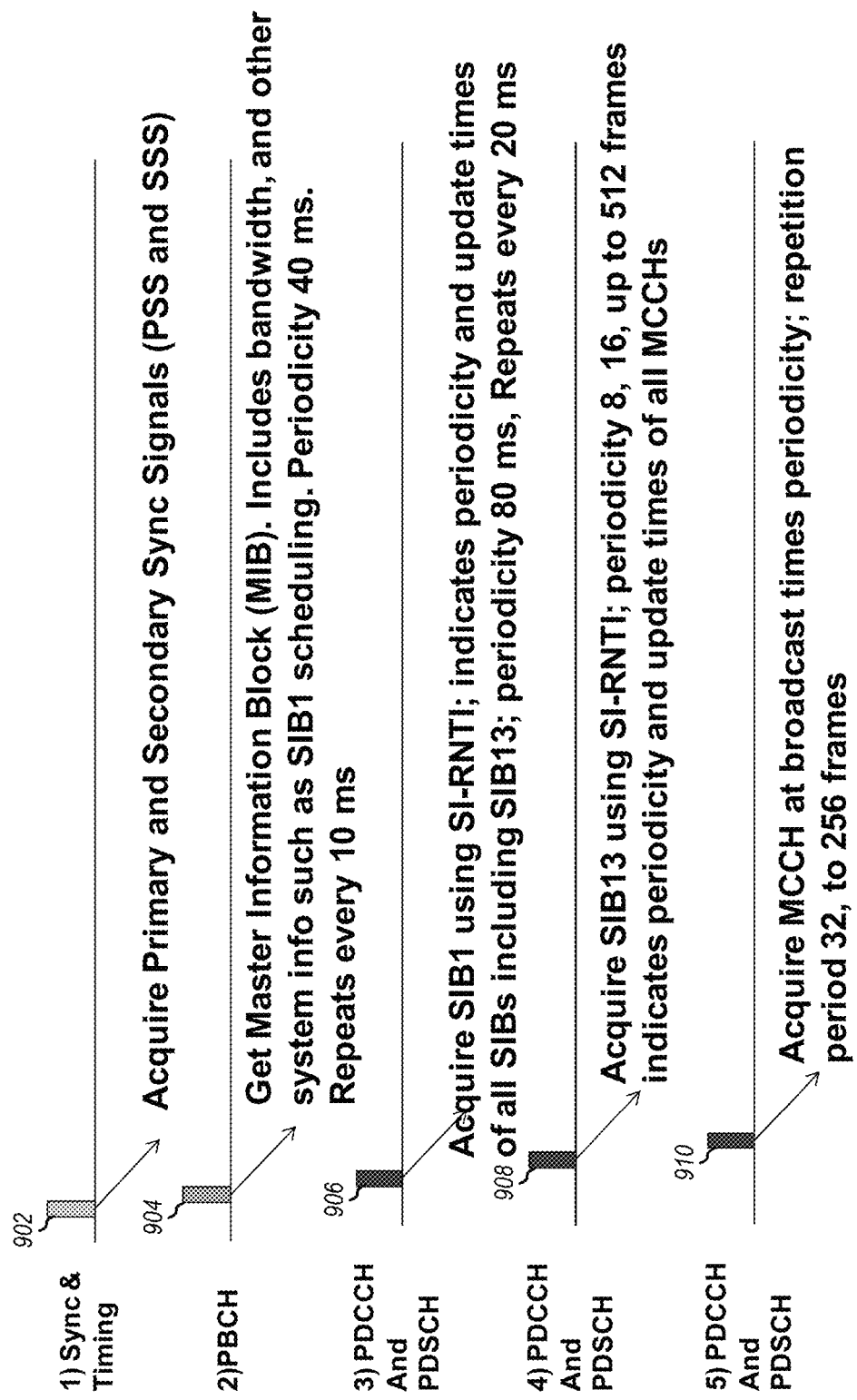
FIG. 9 illustrates an example of a process for detecting multicast services.

FIG. 9 illustrates an example of detecting whether a UE is in or out of a multicast service area. The UE can determine the channel timing and synchronization 902 by acquiring the primary (PSS) and secondary sync signals (SSS). At 904, related to the Physical Broadcast Channel (PBCH), the UE can then acquire the master information block (MIB) which includes bandwidth and other system information, including the SIB1 scheduling. The remaining procedures 906-910 related to the Physical Downlink Control Channel (PDCCH) and Physical Downlink Shared Channel (PDSCH). At 906, the UE can acquire SIB 1 which contains scheduling information regarding all the remaining SIBs including SIB13, which can then be acquired in 908. From SIB13, the MCCH information can be determined. At 910, the MCCH can be acquired and from the MCCH and the UE can check the MBSFN area identifier (ID) and compare it with the provisioned MBSFN area id to check whether the UE is in MBSFN area of interest Alternatively, a change to the SIB13 structure can be made providing the MBSFN area IDs served within the area without having the need to tune MCCH thus saving time in searching for an MBSFN area.

Figure 10:
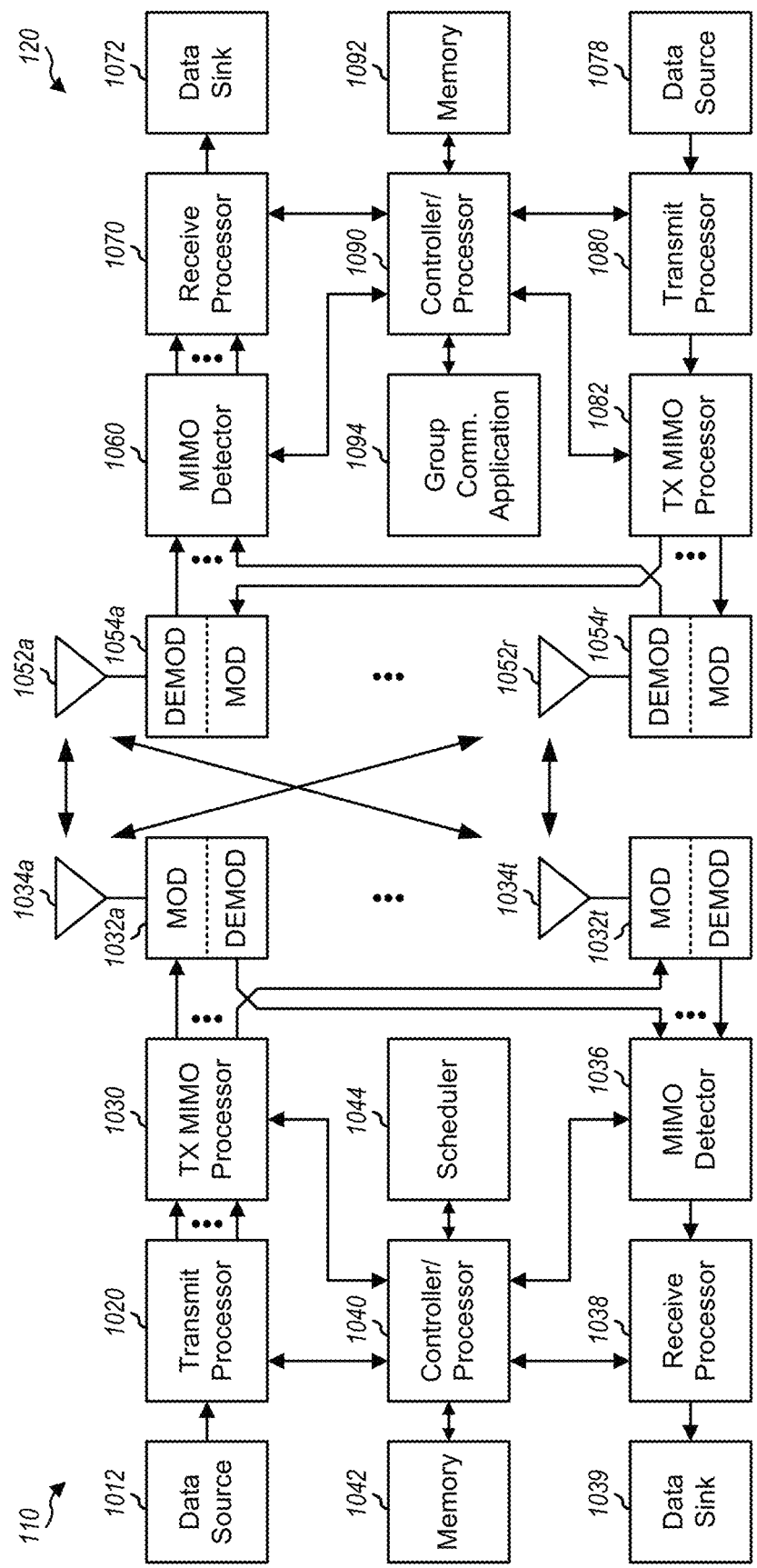
FIG. 10 shows a block diagram of a Node B and a UE

FIG. 10 illustrates a block diagram of a design of an eNode B (e.g., 110 and 510) and UE (e.g., 120, 520, 620 and 820), which may be one of the eNode Bs and one of the UEs discussed herein in relation to the various embodiments. In this design, Node B 110 is equipped with T antennas 1034a through 1034t, and UE 120 is equipped with R antennas 1052a through 1052r, where in general T is greater than or equal to 1 and R is greater than or equal to 1.

At Node B 110, a transmit processor 1020 may receive data for unicast services and data for broadcast and/or multicast services from a data source 1012 (e.g., directly or indirectly from application server 150). Transmit processor 1020 may process the data for each service to obtain data symbols. Transmit processor 1020 may also receive scheduling information, configuration information, control information, system information and/or other overhead information from a controller/processor 1040 and/or a scheduler 1044. Transmit processor 1020 may process the received overhead information and provide overhead symbols. A transmit (TX) multiple-input multiple-output (MIMO) processor 1030 may multiplex the data and overhead symbols with pilot symbols, process (e.g., precode) the multiplexed symbols, and provide T output symbol streams to T modulators (MOD) 1032a through 1032t. Each modulator 1032 may process a respective output symbol stream (e.g., for OFDM) to obtain an output sample stream. Each modulator 1032a through 1032t may further process (e.g., convert to analog, amplify, filter, and upconvert) the output sample stream to obtain a downlink signal. T downlink signals from modulators 1032a through 1032t may be transmitted via T antennas 1034a through 1034t, respectively.

At UE 120, antennas 1052a through 1052r may receive the downlink signals from Node B 110 and provide received signals to demodulators (DEMOD) 1054a through 1054r, respectively. Each demodulator 1054 may condition (e.g., filter, amplify, downconvert, and digitize) a respective received signal to obtain received samples and may further process the received samples (e.g., for OFDM) to obtain received symbols. A MIMO detector 1060 may receive and process the received symbols from all R demodulators 1054a through 1054r and provide detected symbols. A receive processor 1070 may process the detected symbols, provide decoded data for UE 120 and/or desired services to a data sink 1072, and provide decoded overhead information to a controller/processor 1090. In general, the processing by MIMO detector 1060 and receive processor 1070 is complementary to the processing by TX MIMO processor 1030 and transmit processor 1020 at Node B 110.

On the uplink, at UE 120, data from a data source 1078 and overhead information from a controller/processor 1090 may be processed by a transmit processor 1080, further processed by a TX MIMO processor 1082 (if applicable), conditioned by modulators 1054a through 1054r, and transmitted via antennas 1052a through 1052r. At Node B 110, the uplink signals from UE 120 may be received by antennas 1034, conditioned by demodulators 1032, detected by a MIMO detector 1036, and processed by a receive processor 1038, coupled to a data sink 1039, to obtain the data and overhead information transmitted by UE 120.

Controllers/processors 1040 and 1090 may direct the operation at Node B 110 and UE 120, respectively. Controller/processor 1040 may implement processes for the techniques described herein. Memories 1042 and 1092 may store data and program codes for Node B 110 and UE 120, respectively.

Scheduler 1044 may schedule UEs for downlink and/or uplink transmission, schedule transmission of broadcast and multicast services, and provide assignments of radio resources for the scheduled UEs and services. Controller/processor 1040 and/or scheduler 1044 may generate scheduling information and/or other overhead information for the broadcast and multicast services.

In various embodiments, a group communication application 1094 may operate in cooperation with the various processors and other components of the UE 120 to periodically monitor the wireless network to determine if the UE 120 is in or out of multicast service coverage. Depending on the state of multicast coverage, the UE 120 can perform the various functions disclosed herein such as maintaining an ongoing multicast call via unicast and redirecting the multicast call announce and subsequent media. No changes are required to conventional LTE paging or media flows. Accordingly, group communications in the E-MBMS environment can be accomplished in accordance with the various embodiments disclosed herein, while still remaining compliant with the existing standards.

Figure 11:
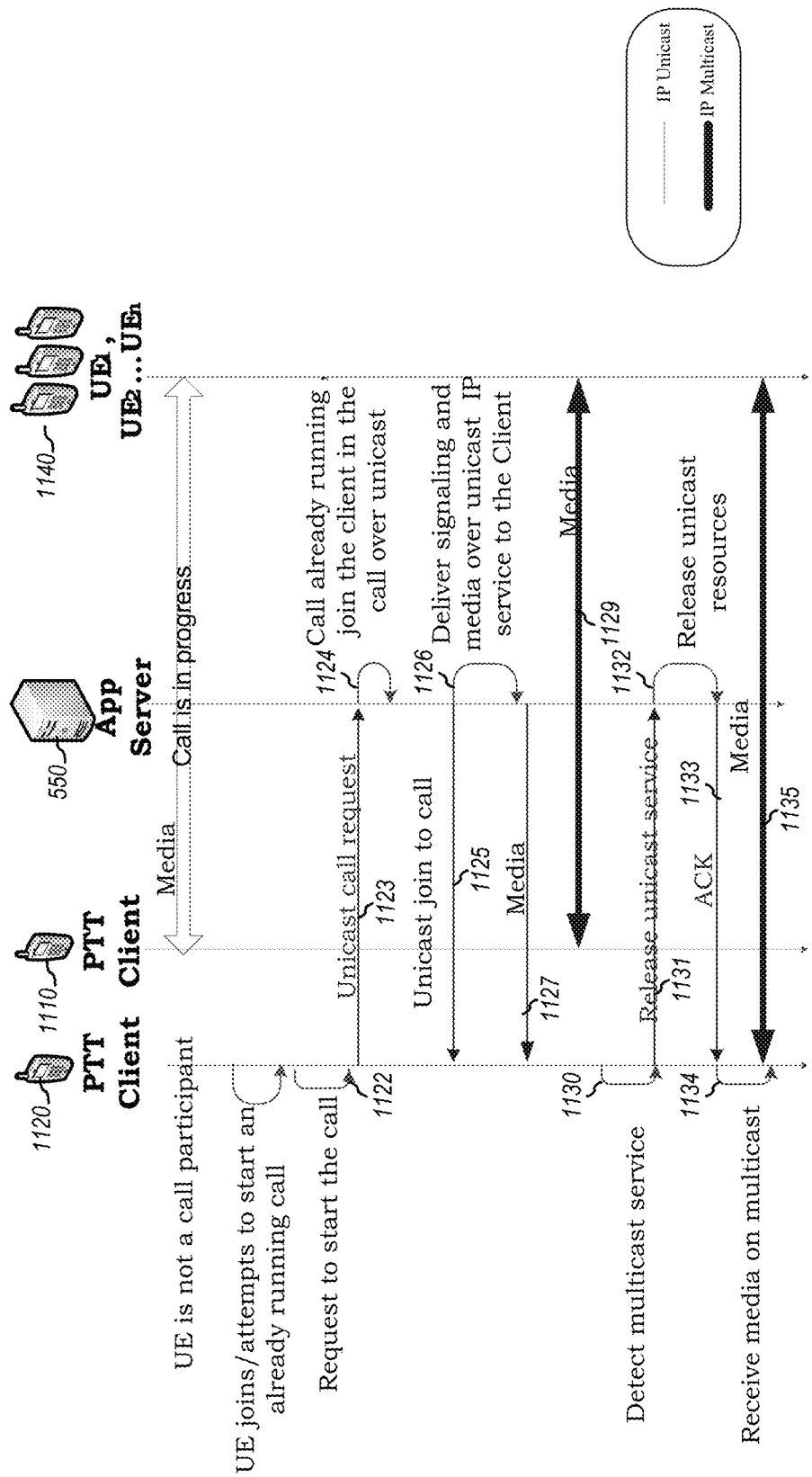
FIG. 11 illustrates an example of mixed casting in accordance with at least one embodiment.

Additionally, while the foregoing has explicitly addressed transitioning from multicast services to unicast services, it will be appreciated that various embodiments include the reciprocal action of detecting a transition into multicast coverage and requesting that the application server switch from communication via unicast to communication via multicast. In the example of FIG. 11, PTT client 1110 and $UE_1$ to $UE_n$ 1140 are participating in a multicast group call. A client UE 1120 that requested unicast services during a call because of loss of multicast coverage or because it wasn't originally a part of the call when the call was established can inform the application server 550 when it returns to multicast coverage. At 1122, the client UE 1120 can request to join the call by a unicast message 1123 to application server 550. At 1124, the application server can determine that the call is already active and send a message 1125 to client UE 1120 to join the call over unicast. At 1126, the application server 550 can start delivering signaling and media 1127 over unicast to the client UE 1120. Meanwhile, the call media is also being transmitted via a multicast service 1129. At 1130, the client UE 1120 detects the multicast service and send a request 1131 to the application server 550 to release the unicast service. At 1132, the application server releases the unicast services and sends an acknowledgement (ACK 1133) to the client UE 1120. At 1134, the client UE 1120 receives the call media via the multicast service 1135.

Likewise, if prior to a call being setup, a UE that is part of a multicast group and had requested unicast service detects that it is in multicast coverage, the UE can then request (e.g., out of band) communications be conducted over the multicast service. Also, although the foregoing examples have related to group communications, it will be appreciated that the disclosed methods, apparatuses and systems can be used in for any multicast media, such as streaming audio and steaming video.

As will further be appreciated, the various embodiments are not limited to a fixed geographic area or static cluster of network components. Rather, the various embodiments can be implemented in any geographic area or cluster of network components.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for group communications over evolved multimedia broadcast/multicast services (E-MBMS). Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for group communications in a mixed casting services wireless communication system comprising:
    monitoring, by the UE, one or more neighboring cells to determine a potential loss of multicast coverage, and wherein the UE determines the potential loss of multicast coverage based on detecting an absence of transmission of a multicast area identifier by the one or more neighboring cells;
    detecting, by a user equipment (UE), a loss of multicast coverage;
    notifying, by the UE, a server over a first unicast service that the UE does not have multicast coverage, wherein the server is configured to provide a desired multicast communication; and
    requesting, by the UE, that communications related to the desired multicast communication be conducted on a second unicast service using application layer signaling independent of link layer signaling.

2. The method of claim 1, further comprising:
    establishing the second unicast service with the server.

3. The method of claim 2, wherein the notifying the server over the first unicast service comprise sending information to assist the server in reserving resources for the second unicast service.

4. The method of claim 2, further comprising:
    detecting a restoration of multicast coverage at the UE;
    notifying the restoration of multicast coverage to the server providing the desired multicast communication; and
    requesting that communications related to the desired multicast communication be conducted on a multicast service.

5. The method of claim 4, further comprising:
    releasing the second unicast service; and
    establishing the multicast service with the server.

6. The method of claim 1, wherein notifying the server is performed using out of band signaling independent of the link layer signaling prior to transmission of the desired multicast communication.

7. The method of claim 1, wherein detecting the loss of multicast coverage occurs during transmission of the desired multicast communication.

8. The method of claim 1, wherein detecting the loss of multicast coverage comprises:
    detecting a loss of a keep alive message from the server.

9. The method of claim 1, wherein detecting the loss of multicast coverage comprises:
    monitoring a broadcast channel to determine whether a multicast flow of interest is present.

10. The method of claim 9, wherein monitoring the broadcast channel comprises monitoring SIB1 and SIB13 to determine whether the multicast flow of interest is present.

11. The method of claim 1, wherein the detecting the loss of multicast coverage comprises:
    detecting, by the UE, that the UE has moved into a coverage area of one of the one or more neighboring cells.

12. The method of claim 11, wherein the detecting the loss of multicast coverage comprises detecting an absence of transmission of a multicast area identifier by the one of the one or more neighboring cells; and
    wherein the method further comprises reporting the potential loss of multicast coverage to the server.

13. The method of claim 11, further comprising:
    reporting the potential loss of multicast coverage to the server, when the one or more neighboring cells do not have multicast coverage.

14. An apparatus for group communications in a mixed casting services wireless communication system comprising:
    at least one processor coupled to or configured to execute logic comprising:
        logic configured to monitor one or more neighboring cells to determine a potential loss of multicast coverage, and wherein the UE determines the potential loss of multicast coverage based on detecting an absence of transmission of a multicast area identifier by the one or more neighboring cells;

logic configured to detect a loss of multicast coverage at a user equipment (UE);

logic configured to notify a server over a first unicast service that the UE does not have multicast coverage, wherein the server is configured to provide a desired multicast communication; and logic configured to request that communications related to the desired multicast communication be conducted on a second unicast service using application layer signaling independent of link layer signaling.

15. The apparatus of claim 14, further comprising:
logic configured to establish the second unicast service with the server.

16. The apparatus of claim 15, wherein the logic configured to notify the server over the first unicast service comprise logic configured to send information to assist the server in reserving resources for the second unicast service.

17. The apparatus of claim 15, further comprising:
logic configured to detect a restoration of multicast coverage at the UE;
logic configured to notify the restoration of multicast coverage to the server configured to provide the desired multicast communication; and
logic configured to request that communications related to the desired multicast communication be conducted on a multicast service.

18. The apparatus of claim 17, further comprising:
logic configured to release the second unicast service; and
logic configured to establish the multicast service with the server.

19. The apparatus of claim 14, wherein the logic configured to notify the server comprises logic configured to notify the server using out of band signaling independent of the link layer signaling prior to transmission of the desired multicast communication.

20. The apparatus of claim 14, wherein the logic configured to detect the loss of multicast coverage comprises logic configured to detect the loss of multicast coverage during transmission of the desired multicast communication.

21. The apparatus of claim 14, wherein the logic configured to detect the loss of multicast coverage comprises:
logic configured to detect a loss of a keep alive message from the server.

22. The apparatus of claim 14, wherein the logic configured to detect the loss of multicast coverage comprises:
logic configured to monitor a broadcast channel to determine if a multicast flow of interest is present.

23. The apparatus of claim 22, wherein the logic configured to monitor the broadcast channel comprises logic configured to monitor SIB1 and SIB13 to determine if the multicast flow of interest is present.

24. The apparatus of claim 14, wherein the logic configured to detect the potential loss of multicast coverage comprises:

logic configured to detect that the UE has moved into a coverage area of one of the one or more neighboring cells.

25. The apparatus of claim 24, wherein the logic configured to detect the potential loss of multicast coverage comprises logic configured to detect an absence of transmission of a multicast area identifier by the one of the one or more neighboring cells; and
wherein the apparatus further comprises logic configured to report the potential loss of multicast coverage to the server.

26. The apparatus of claim 24, further comprising:
logic configured to report the potential loss of multicast coverage to the server, when the one or more neighboring cells do not have multicast coverage.

27. An apparatus for group communications in a mixed casting services wireless communication system comprising:
means for monitoring one or more neighboring cells to determine a potential loss of multicast coverage, and wherein the UE determines the potential loss of multicast coverage based on detecting an absence of transmission of a multicast area identifier by the one or more neighboring cells;
means for detecting a loss of multicast coverage at a user equipment (UE);
means for notifying a server over a first unicast service that the UE does not have multicast coverage, wherein the server is configured to provide a desired multicast communication; and
means for requesting that communications related to the desired multicast communication be conducted on a second unicast service using application layer signaling independent of link layer signaling.

28. A non-transitory computer-readable medium for group communications in a mixed casting services wireless communication system comprising:
at least one instruction to monitor one or more neighboring cells to determine a potential loss of multicast coverage, and wherein the UE determines the potential loss of multicast coverage based on detecting an absence of transmission of a multicast area identifier by the one or more neighboring cells;
at least one instruction to detect a loss of multicast coverage at a user equipment (UE);
at least one instruction to notify a server over a first unicast service that the UE does not have multicast coverage, wherein the server is configured to provide a desired multicast communication; and
at least one instruction to request that communications related to the desired multicast communication be conducted on a second unicast service using application layer signaling independent of link layer signaling.

* * * * *